United States Patent [19]
Dee

[11] Patent Number: 5,720,159
[45] Date of Patent: Feb. 24, 1998

[54] COLLAPSIBLE LEAF RAKE

[76] Inventor: Maurice Dee, Box 117, RR #3, Puslinch, Ontario, Canada, N0B 2J0

[21] Appl. No.: 589,990

[22] Filed: Jan. 23, 1996

[51] Int. Cl.[6] ........................................... A01D 7/06
[52] U.S. Cl. ........................ 56/400.18; 56/400.19
[58] Field of Search ................... 56/400.19, 400.04, 56/400.18, 400.2

[56] References Cited

U.S. PATENT DOCUMENTS

| | | |
|---|---|---|
| 693,986 | 2/1902 | Simpson . |
| 1,916,052 | 6/1933 | Jenkins . |
| 2,233,682 | 3/1941 | Welcome . |
| 2,694,880 | 11/1954 | Artese . |
| 2,767,545 | 10/1956 | Jenkins ............... 56/400.18 |
| 3,390,516 | 7/1968 | Burrows . |
| 3,727,389 | 4/1973 | Huspen . |
| 4,086,750 | 5/1978 | White ................. 56/400.18 |
| 4,236,742 | 12/1980 | Florence . |
| 4,843,667 | 7/1989 | Hanly, Sr. . |
| 4,866,922 | 9/1989 | Clark . |
| 4,901,515 | 2/1990 | McLeod et al. . |
| 4,974,894 | 12/1990 | Dubow . |
| 5,133,177 | 7/1992 | Miller . |
| 5,414,982 | 5/1995 | Darnell . |
| 5,440,868 | 8/1995 | Darnell . |

*Primary Examiner*—Terry Lee Melius

[57] ABSTRACT

A collapsible leaf rake having a plurality of overlapping tine sections in which one of the tine sections is fixed to the handle, the other tine sections being relatively movable with respect to each other and to the handle about the pivot so that the with of the rake head may be adjusted and the leaf rake may be stored with the tine sections superimposed in alignment with the handle. Spacing means are also provided, comprising a transversely-extending pin on a tine section and a stop slot adapted to receive the pin provided on adjacent tine sections, the length of the slots defining the maximum angular separation between adjacent tine sections in a spread-out configuration.

21 Claims, 3 Drawing Sheets

COLLAPSIBLE LEAF RAKE

FIELD OF THE INVENTION

This invention relates to a collapsible leaf rake which is portable and is particularly adapted for use by golfers who have the predicament of retrieving a golf ball which is hidden by leaves and other debris.

BACKGROUND OF THE INVENTION

While a variety of rakes have been conceived in which the head is collapsible or retractable, conveniently to save space during storage of the rake, there has yet to be developed a rake which is so portable that it may be conveniently transported in a golf bag. In part, known rakes are unsuitable because the head remains too bulky and is unsightly. A large variety of mechanisms for collapsing or retracting the rake head have also been proposed and these are, by and large, too complex to be used in circumstances where access to special tools is limited and very often these mechanisms add to the weight and bulk of the rake itself.

An object of this invention is to provide a collapsible leaf rake which, at least in part, addresses the aforementioned problems and which is easy to assemble so that it may be manufactured and maintained at a reasonable cost.

SUMMARY OF THE INVENTION

In accordance with the invention, there is provided a collapsible leaf rake having a longitudinally-extending handle and a head disposed at one end of the handle. The head comprises a plurality of overlapping tine sections, each having at least one longitudinally-extending tine and a base apertured to receive a common pivot. One of the tine sections is fixed to the handle so that the other tine sections are relatively moveable with respect to each other and to the handle about the pivot. In this way, the width of the head may be adjusted and the leaf rake may be stored with the tine sections superimposed in alignment with the handle.

In a preferred embodiment of the invention, the handle is dimensioned to be received inside a plastic tube insert commonly found inside golf bags for accommodating golf clubs.

The invention also provides spacing means for the tines comprising a transversely-extending pin on a tine section and a stop slot formed in an adjacent tine section which is adapted to receive the pin, the length of the slot being selected to define the maximum angular separation between adjacent tine sections.

BRIEF DESCRIPTION OF THE DRAWINGS

A preferred embodiment of the invention will now be described with reference to the accompanying drawings, in which.

DESCRIPTION OF PREFERRED EMBODIMENT WITH REFERENCE TO THE DRAWINGS

Figure 1:
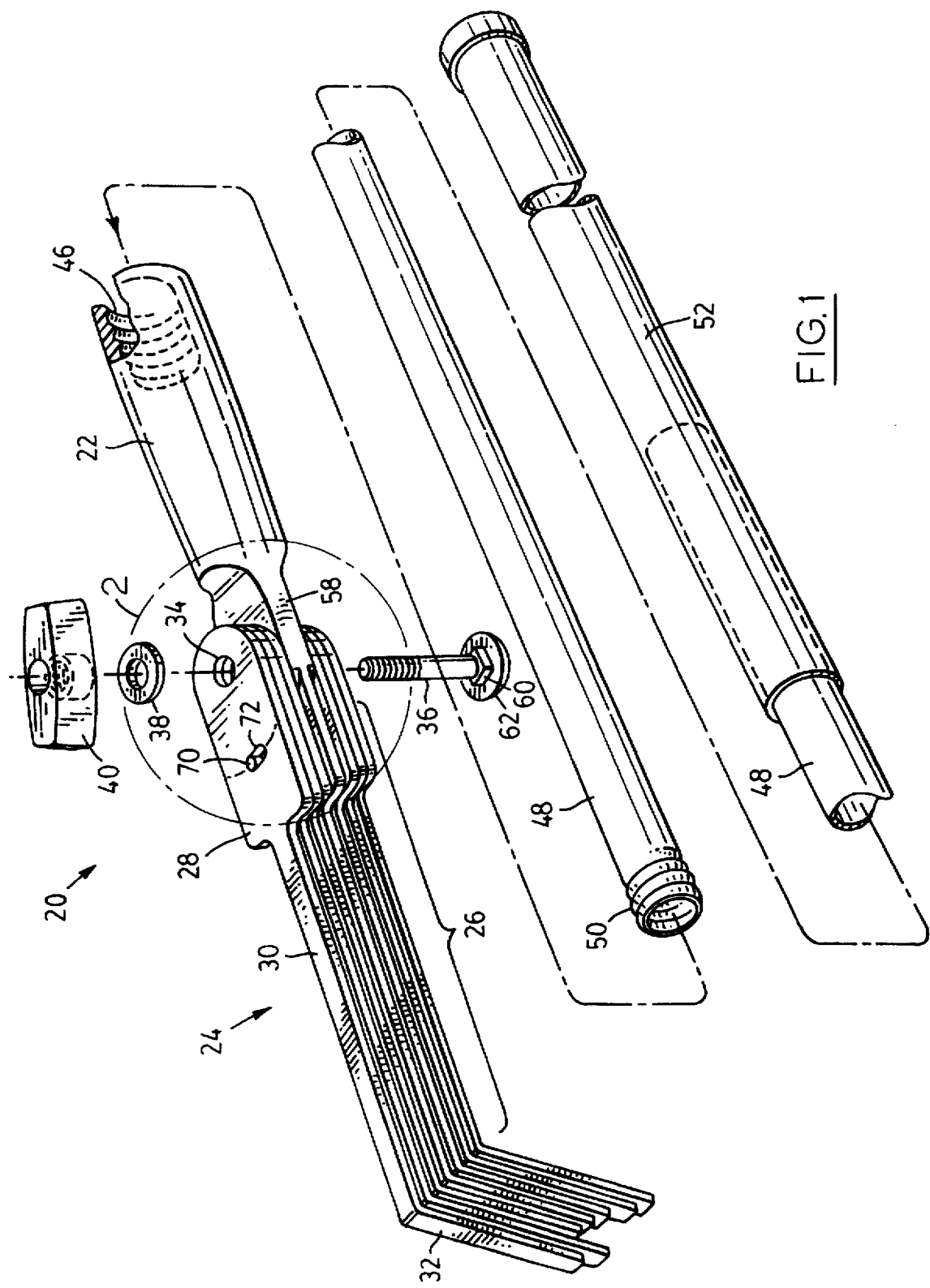
FIG. 1 is a perspective view showing a leaf rake according to the invention (in a stored configuration), showing a handle extension for storage in a tube.

The leaf rake, according to the invention, is generally indicated in FIG. 1 by reference numeral 20 and consists of a handle 22 at one end and a head 24 disposed at the other end. The head 24 comprises a plurality of overlapping tine sections 26, consisting of an enlarged base 28, a single, longitudinally-extending tine 30 and a tooth 32.

The tine sections are preferably moulded from a rigid plastics material and are substantially planar, the tines 30 being flat and of rectangular section and having a hooked end terminating in respective transversely-extending teeth 32. An aperture 34 is formed in the base 28 for each tine section 26 and the apertures 34 in all of the tine sections are aligned to receive a common pivot in the form of a bolt 36. The bolt 36 traverses the tine sections 26 and is secured by a washer 38 and wing nut 40 which is threaded on the bolt 36 and which may be released to adjust the respective radial positions of the tine sections 26. In FIG. 1, the tine sections 26 are drawn in a stored configuration with the tine sections superimposed and in alignment with the handle 22.

It will be noted that the length of the tine sections between a base 28 and a tooth 32 is greater in the operatively-uppermost tine sections 26 (as drawn) than in the lower tine sections 26 so that the teeth 32 in adjacent tine sections nest in the stored configuration. The longer tine sections 26 have a correspondingly longer base 28 for reinforcement.

Figure 4:
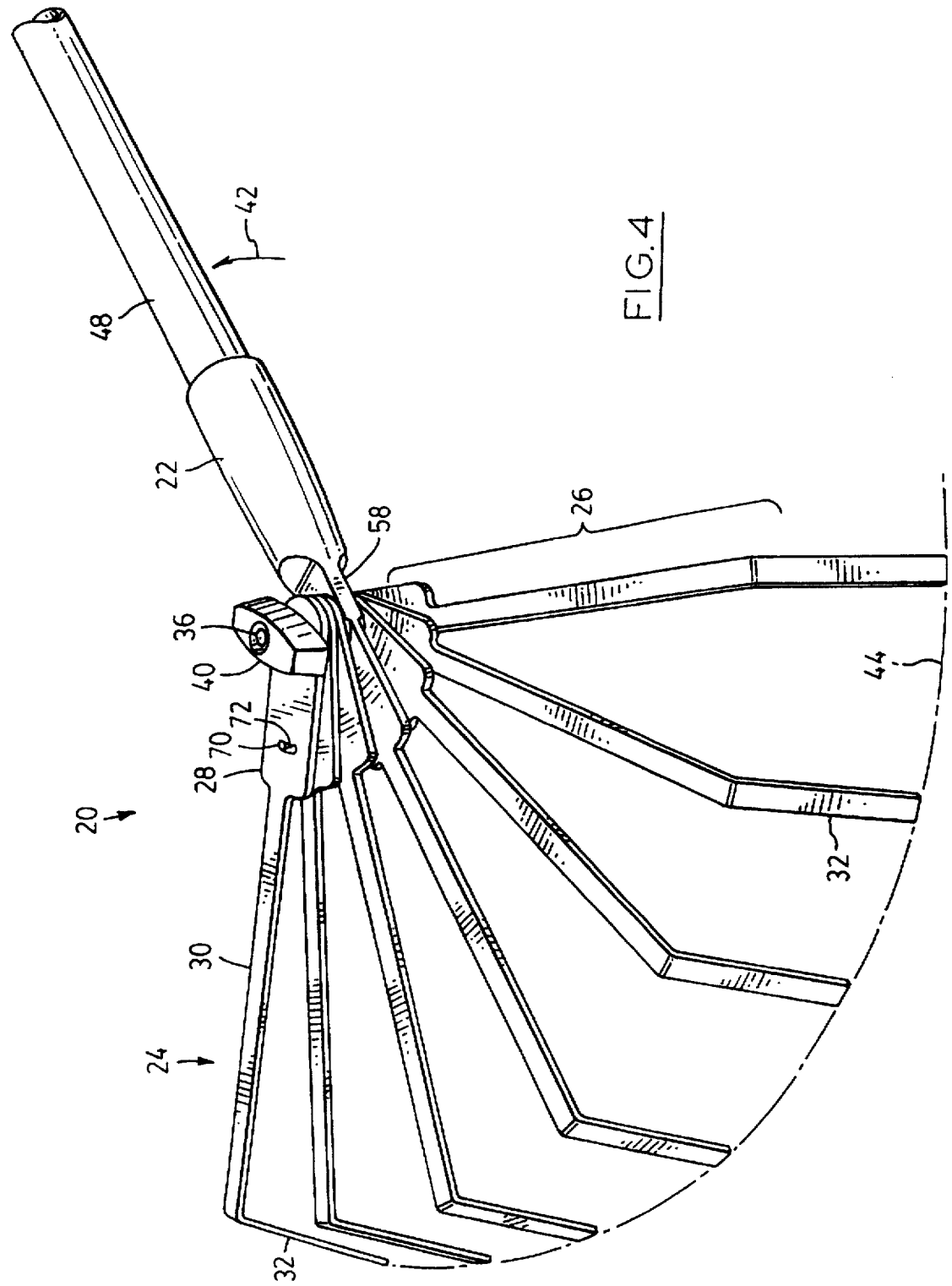
FIG. 4 is a perspective view of the leaf rake in a spread-out configuration.

The length of the teeth 32 is selected so that the teeth in the outermost tine sections 26 are longer than the teeth in the inner tine sections nested between the teeth in the outermost tine sections. Thus, when the tines 30 are in a spread-out configuration, as drawn in FIG. 4, and the handle 22 is slightly inclined from the horizontal, as indicated by arrow 42, the teeth 32 will inscribe an arc 44 which lies in a common plane. In this way, all of the teeth will be effective in reaching the ground and removing debris and leaves to uncover a lost golf ball.

The handle 22 has a hollow end with an internal screw thread 46 which is adapted to cooperate with a handle extension 48 having a complementary screw thread termination 50. In the embodiment drawn, the handle extension 48 is tubular and made of metal but could equally be substituted by a solid wood shaft. Conveniently, the handle extension 48 is dimensioned to be received for storage in a tube 52 commonly provided inside golf bags for the storage of golf clubs.

Figure 2:
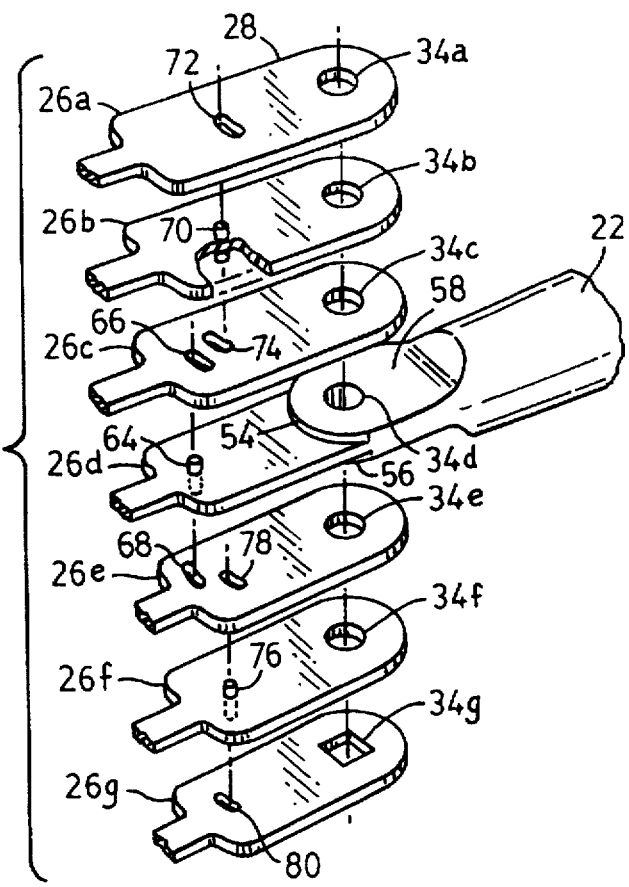
FIG. 2 is an exploded view of Area 2 in FIG. 1.
Figure 3:
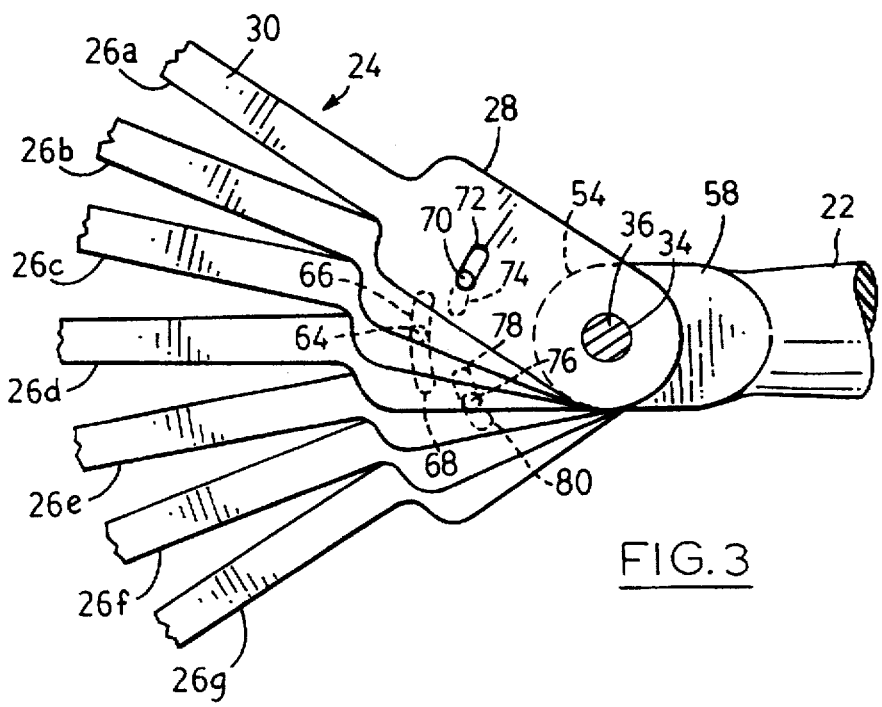
FIG. 3 is a top plan view, showing a portion of the leaf rake in a spread-out configuration.

In this embodiment of the invention, there are seven tine sections 26 respectively identified by the letters a–g in FIG. 2 of the drawings. The central tine section 26d is rigidly fixed to the handle. In particular, tine section 26d is integral with the handle 22 and has a somewhat thickened area on the base 28 defining an upper and a lower boss 54, 56 formed around the aperture 34d and shaped into a lug 58 which extends from the handle 22.

It will be noted that the aperture 34g in the bottom-most tine section 26g is of square cross-section whereas the remaining apertures 34a–f are round. The square aperture 34g locates a square washer 60 integral with the bolt 36 and adjacent to a head 62 for the bolt so as to prevent relative movement between the bolt and the bottom tine section 26g.

The leaf rake, according to the invention, also includes spacing means to define the maximum angular separation between adjacent tine sections. In the central tine section 26d, there is provided a first transversely-extending pin 64 extending upwardly and downwardly to either side of the base 28 between the aperture 34d for receiving the bolt 36 and the tines 30. The adjacent tine sections 26c, 26e have respective corresponding stop slots 66, 68 positioned so that the pin 64 will align with the slots 66, 68. A second pin 70 extends transversely on opposite sides of the tine section 26b and similarly locates in slot 72 defined in the upper-most tine section 26a and in stop slot 74 formed in the underlying tine section 26c on a shorter radial distance from the aperture 34 than the first-mentioned slot 66. A third pin 76 extends on opposite sides of tine section 26f and is received in corresponding stop slots 78, 80 on tine sections 26e and 26g, respectively. Conveniently, the stop slots 78, 80 are separated from the respective associated apertures 34e, f by the same radial distance separating stop slots 72, 74 from their respective associated apertures 34a, c.

In use, the tines are superimposed in the stored configuration shown in FIG. 1 where they are brought into alignment with the handle which, by virtue of its construction, is integral with the central tine section 26d. When it becomes necessary to retrieve a golf ball hidden under leaves and brush, the head 24 is brought into its spread-out configuration shown in FIG. 4 by moving the individual tine sections 26 about the bolt 36, the maximum angular separation between the tines 30 being defined by the length of the stop slots 66, 68; 72, 74; and 78, 80. If necessary, the wing nut 40 may be released to facilitate separation of the tines 28.

It will be understood that the leaf rake, according to the invention, may equally be used for gardening and is not limited in its application to the retrieval of golf balls. It will also be understood that several variations may be made to the above-described embodiment of the invention within the scope of the appended claims. It is understood that each tine section may comprise more than a single tine 30 and could, for example, include a multiplicity of tines. This would result in a leaf rake which would have a greater dimensional width in its collapsed, stored configuration. It will also be understood that the fixed tine section may be fixed to the handle in a number of ways and that the fixed tine section may be disposed with the remaining tine sections above or below, as the case may be. Other variations may be apparent to those skilled in the art.

I claim:

1. A collapsible leaf rake having a longitudinally-extending handle and a head disposed at one end of the handle,
    the head comprising at least three overlapping tine sections, each having at least one longitudinally-extending tine and a base apertured to receive a common pivot, one of said tine sections being a fixed tine section fixed to the handle, the other tine sections being relatively moveable with respect to each other and to the handle about said pivot so that the with of the head may be adjusted, and the leaf rake may be stored with the tine sections superimposed in alignment with said handle.

2. Collapsible rake according to claim 1 in which said fixed tine section is integral with the handle.

3. Collapsible rake according to claim 1 in which said fixed tine section is disposed on the common pivot with at least one of the other tine sections on opposite sides thereof.

4. Collapsible rake according to claim 3 in which there is an equal number of tine sections on opposite sides of the fixed tine section.

5. Collapsible rake according to claim 1 in which the handle has a screw thread termination adapted to cooperate with a handle extension having a complementary screw thread termination.

6. Collapsible rake according to claim 1 in which the handle is dimensioned to be received inside a tube for storage inside a golf bag.

7. Collapsible rake according to claim 1 in which at least one tine section has a base which carries a transversely-extending pin, and an adjacent tine section has a stop slot adapted to receive said pin, the length of the slot being selected to define the maximum angular separation between said adjacent tine sections upon pivoting of the tine sections about said pivot.

8. Collapsible rake according to claim 1 in which any tine in a tine section is hooked and terminates in a transversely-extending tooth, any operatively upper tine section being longer between a base and a tooth than any tine section operatively lower than said upper tine section so that the teeth in adjacent tine sections will nest when the tine sections are superimposed in alignment with the handle.

9. Collapsible rake according to claim 8 in which the longer tine sections have a correspondingly longer base for reinforcement of the tine sections.

10. Collapsible rake according to claim 8 in which the length of the tooth of said at least one tine in respective tine sections is selected so that a tooth in an operatively outer tine section is longer than a tooth in an operatively inner in tine section.

11. A collapsible leaf rake having a longitudinally-extending handle and a head disposed at one end of the handle, the head comprising a plurality of overlapping relatively movable, tine sections each having at least one longitudinally-extending tine and a base apertured to receive a common pivot mounted to said handle, at least one tine section having a base which carries a transversely-extending pin spaced from said pivot and an adjacent tine section having a stop slot adapted to receive said pin, the length of the slot being selected to define the maximum angular separation between said adjacent tine sections upon pivoting of the tine sections about said pivot to adjust the effective width of the head.

12. A collapsible leaf rake having a longitudinally-extending handle and a head disposed at one end of the handle,
    the head comprising at least two overlapping tine sections and a pivot, each tine section having at least one longitudinally-extending tine and a base apertured to receive said pivot, the handle being rigidly fixed at said one end thereof to the base of one of said at least two overlapping tine sections, said handle being remote from said pivot, said tine sections being relatively movable with respect to each other about said pivot so that the width of the head may be adjusted, and the leaf rake may be stored with the tine sections superimposed in alignment with said handle.

13. Collapsible leaf rake according to claim 12 in which said handle is integral with said one of said at least two overlapping tine sections.

14. Collapsible rake according to claim 12 in which the handle has a screw thread termination adapted to cooperate with a handle extension having a complementary screw thread termination.

15. Collapsible rake according to claim 12 in which the handle is dimensioned to be received inside a tube for storage inside a golf bag.

16. Collapsible leaf rake according to claim 12 in which at least one tine section has a base which carries a transversely-extending pin and an adjacent tine section has a stop slot adapted to receive said pin, the length of the slot being selected to define the maximum angular separation between said adjacent tine sections upon pivoting the tine sections about said pivot.

17. Collapsible rake according to claim 12 in which any tine in a tine section is hooked and terminates in a transversely-extending tooth, an operatively upper tine section being longer between a base and a tooth than an operatively lower tine section so that the teeth in said tine sections will nest when the tine sections are superimposed in alignment with the handle.

18. Collapsible leaf rake according to claim 17 in which the longer tine sections have correspondingly longer bases for reinforcement of the tine sections.

19. Collapsible leaf rake according to claim 12 having at least three tine sections in which, on opposite sides of said tine section rigidly fixed to said handle, is disposed at least one of the other tine sections.

20. Collapsible leaf rake according to claim 19 in which there is an equal number of tine sections on opposite sides of said tine section rigidly fixed to said handle.

21. Collapsible leaf rake according to claim 17 in which the length of the tooth of said at least one tine in respective tine sections is selected, so that a tooth in an operatively outer tine section is longer than a tooth in an operatively inner tine section.

* * * * *